United States Patent Office 3,128,901
Patented Apr. 14, 1964

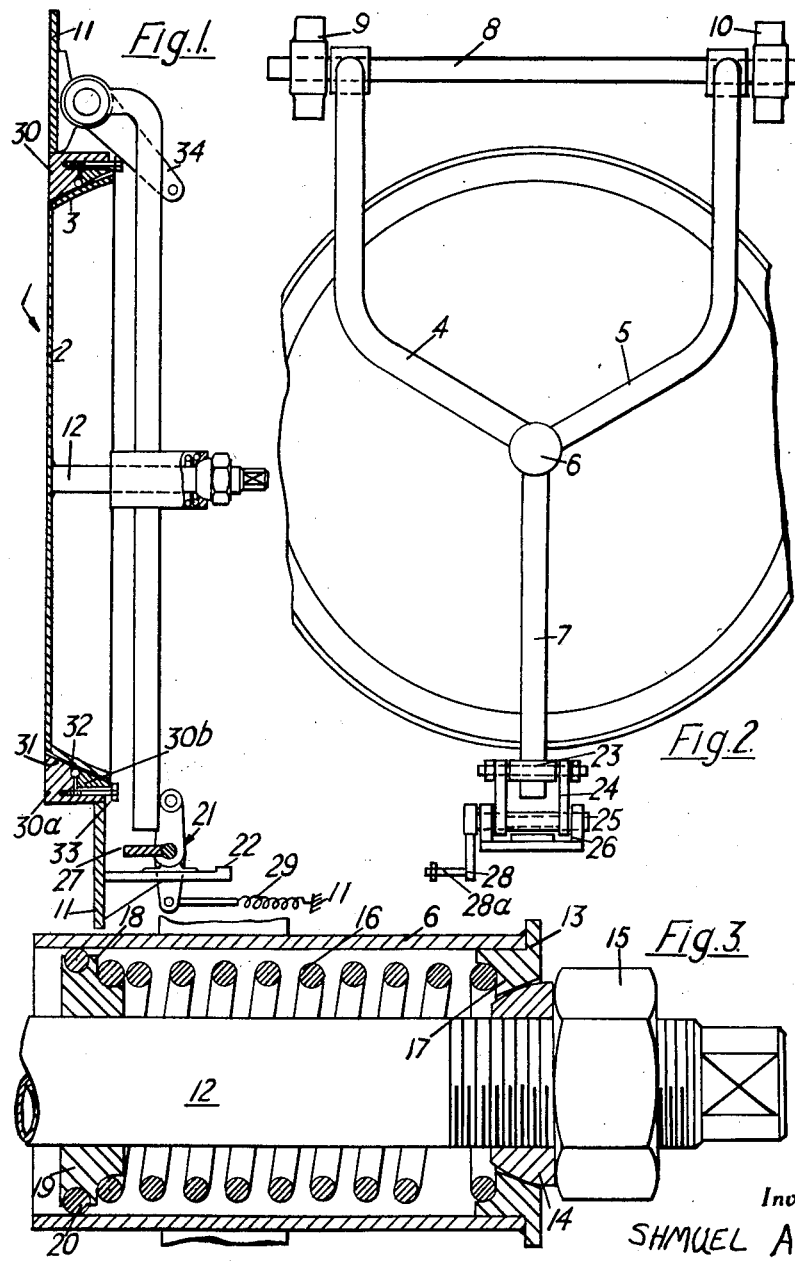

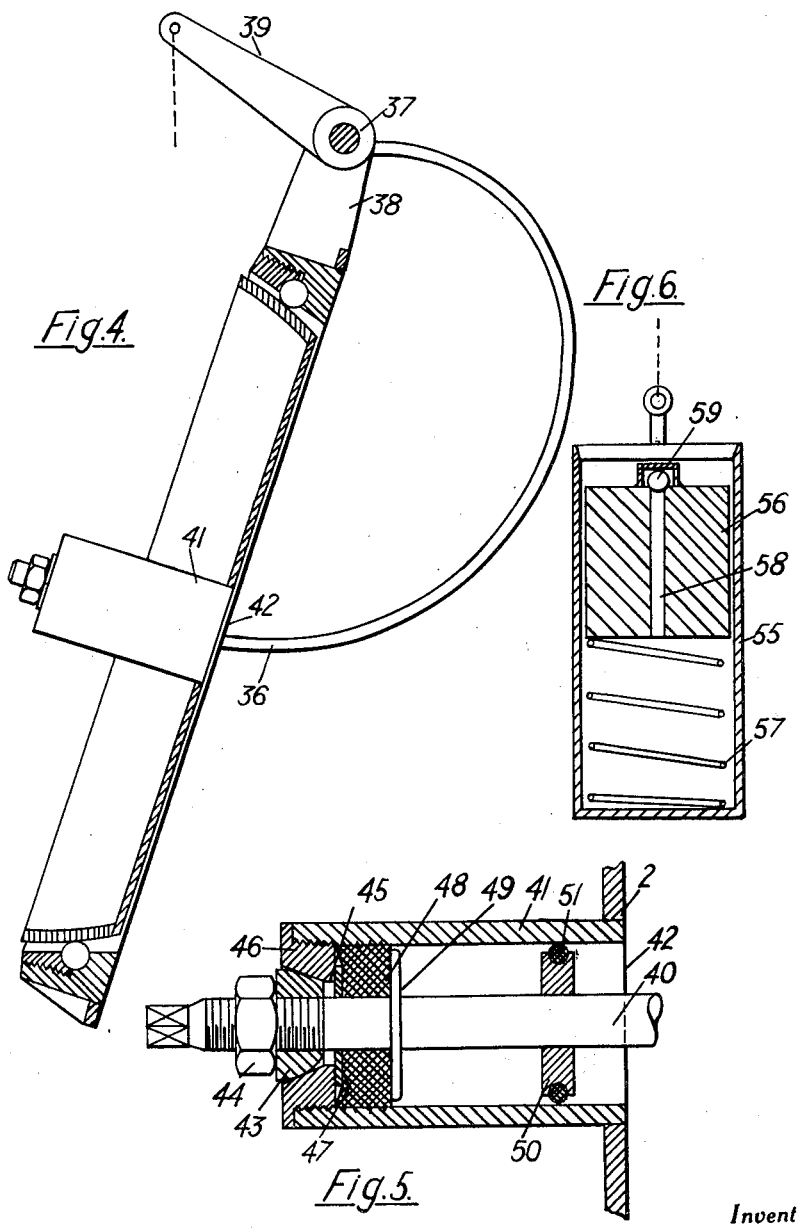

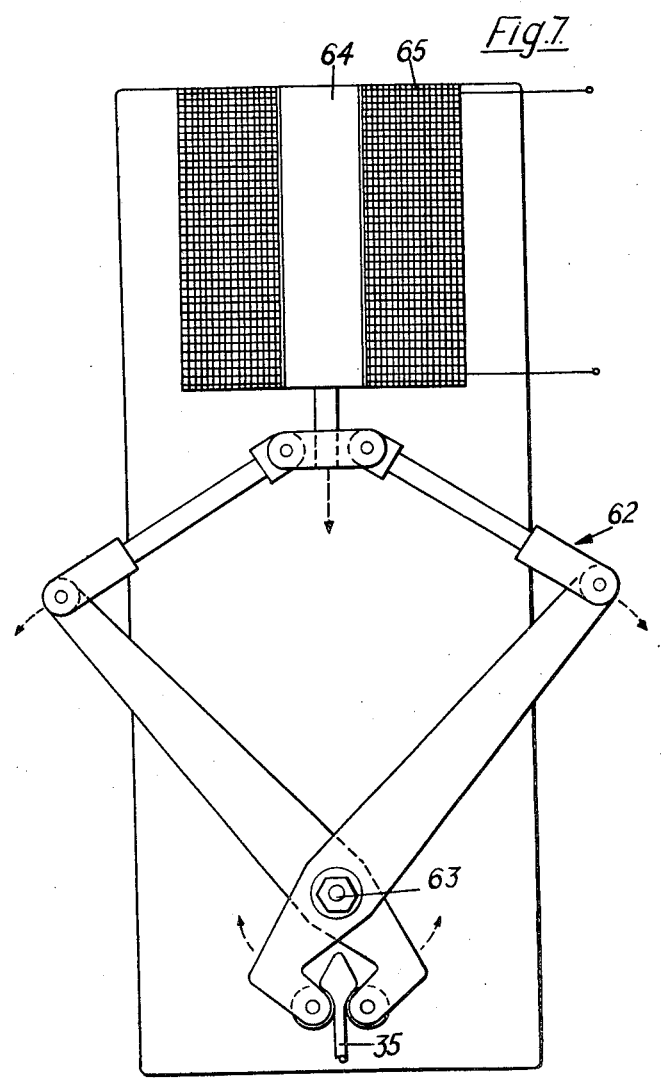

3,128,901
EMERGENCY SEALING DEVICES
Shmuel Agnon, Haifa, Israel, assignor to The State of Israel, Ministry of Defense, Hakirya, Tel Aviv, Israel
Filed Feb. 5, 1963, Ser. No. 256,327
5 Claims. (Cl. 220—57)

This invention relates to emergency sealing devices of a kind designed to effect the sealing of the outlet apertures of an installation. Such devices are generally required to operate under emergency conditions so as, for example, to prevent the passage of noxious substances through the oulets. The use of such sealing devices is particularly indicated with installations such as atomic reactors wherein it is essential to effect a seal of the outlet apertures directly a detectable amount of noxious materials passes through the outlet. In the case of atomic reactors, the noxious materials are generally radio-active and it is a matter of extreme urgency that the emergency sealing devices should effectively seal all the outlets through which such radio-active materials pass into the surrounding atmosphere with the least possible delay.

The essential requirements therefore of such an emergency sealing device are speed in operation and effectiveness in sealing.

It is an object of the present invention to provide an emergency sealing device in which these requirements are essentially met.

According to the present invention there is provided an emergency sealing device for sealing an aperture comprising a drop flap having a substantially spherically faced rim adapted sealingly to seat against a sealing ring fixed around the aperture, flap support means adapted to be pivotally mounted with respect to a support structure and so coupled to the drop flap as to permit limited pivotal displacement of the flap with respect to the support means about a point substantially located at the spherical centre of the rim, first means for releasably retaining the flap out of engagement with the ring and second means for retaining the flap in sealing engagement with the ring after the flap has been released so as to drop into said sealing engagement.

With such a device the first means which can be electrically operated can be arranged automatically to release the flap as soon as the level of noxious materials passing through the outlet rises above a predetermined level. Once released, the flap falls under gravity into sealing engagement with the sealing ring. The release and fall of the flap can be arranged to occupy only a fraction of a second. The provision whereby the flap is so coupled to its support means as to be capable of limited swivelling about the centre of its spherical rim allows for a self-centering of the flap with respect to its seating. Thus, as a result of this self-centering, the flap will always take up a sealing disposition irrespective of any slight manufacturing tolerances which may be encountered in the construction of the spherical rim and its sealing ring. Furthermore, this self-centering action allows for any slight distortion in the disc sealing surface as a result of stresses induced due to its quick release and fall.

The construction of the device can be suitably modified so as to meet the requirements wherein the device can be wholly accommodated within an outlet duct and the case wherein the flap support means must be accommodated outside the duct whilst the flap itself seals the duct.

Two arrangements of an emergency sealing device in accordance with the present invention will now be described by way of example and with reference to the accompany drawings in which:

FIG. 1 is a longitudinal sectional view of a first form of sealing device shown in a sealing disposition;

FIG. 2 is a front elevation of the device shown in FIG. 1;

FIG. 3 is a cross-sectional view on an enlarged scale of a detail of the device shown in FIG. 1;

FIG. 4 is a longitudinal sectional view of a second form of sealing device in accordance with the invention;

FIG. 5 is a cross-sectional view on an enlarged scale of a detail of the device shown in FIG. 4;

FIG. 6 is a longitudinal sectional view of a flap retaining mechanism for use with the device shown in FIG. 4, and FIG. 7 is a diagrammatic representation of a flap quick release mechanism.

The devices shown in FIGS. 1, 2, and 3 of the drawings comprise a circular dish-shaped sealing flap 1 consisting of a planar circular disc base 2 and a spherical rim 3. A flap support means is constituted by a pair of support arms 4 and 5 which extend for about half their length radially from a sleeve 6 with which they are formed integrally, the sleeve 6 being substantially coaxial with the central axis of the flap 1. A third arm 7 is also formed integrally with this sleeve 6 and extends radially and downwardly therefrom. The upper end of the arms 4 and 5 are directed parallel to each other and are mounted on a substantially horizontal axle 8 which is rotatably mounted on bearings 9 and 10 secured to a support framework 11.

The sleeve 6 surrounds an elongated spindle 12 which is secured to the central portion of the disc 2 and extends normally therefrom. As can be seen in more detail in FIG. 3 of the drawings, the outer end of the sleeve 6 has secured thereto a collar 13 whose inner surface tapers conically and bears on a spherically faced bearing 14 which is screwed on the spindle 12 and held in position by a lock nut 15. A compression spring 16 is disposed within the sleeve 6 and surrounds the spindle 12 and bears at one end against a shoulder 17 formed in the collar 13 and at the other end against a shoulder 18 formed in a collar 19 which surrounds and is secured to the spindle 12. The collar 19 is provided with a resilient ring 20 which retains the spindle 12 centrally within the sleeve 6.

A retaining device 21 is mounted on a bracket 22 which is in turn secured to part of the support framework 11. The retaining device comprises a bar 23 which is supported at its end by a pair of support rods 24 which are respectively secured at their opposite ends to a rotatable axle 25 which is rotatably mounted on bearings 26. Also secured to the axle 25 is a trip bar 27 disposed at right angles to the support rods 24. The axle 25 is furthermore secured to a crank 28 from which projects a pin 28a to which is secured one end of a tension spring 29, the other end of which is secured to an opposite portion of the support framework 11.

As seen in the drawings, the flap is disposed within a circular aperture which is defined within a ring 30 having a conically tapered inner surface 31. A sealing ring 32 is set into the surface 31 so as to project slightly therefrom. The sealing ring 32 is held in position between two component parts 30a and 30b of the ring 30 which are clamped together by means of a bolt 33.

The axle 8 has furthermore secured to it a lever 34 designed to be coupled to a shock absorbing mechanism (not shown).

In normal use the aperture which, for example, is constituted by the bore of an outlet duct remains open and the sealing flap is retained away from ring 30 in a substantially horizontal position. The retaining of the flap in its position is effected by means of a quick release retaining mechanism described below with reference to FIG. 7 of the drawings, which is arranged to grip the end of a pin 35 secured to the disc 2.

With the release of the flap from its horizontal position the latter descends under gravity and the spherical rim 3 seats against the sealing ring 32. When the rim is so seated, the two lines of contact of the rim with the sealing ring 32 lie in the same plane as the longitudinal axis of the axle 8. The shock of impact between the flap and the ring is somewhat cushioned due to the provision of a shock absorber system (not shown) coupled to the lever 34. With the descent of the flap, the arm 7 strikes the trip bar 27 secured to axle 25 whose support arms 24, prior to the descent of the flap 1, are disposed in a horizontal position. As a result of the impact of the arm 7 on the trip bar 27, the arms 24 are rotated by a quarter turn in an anticlockwise direction as the result of which the retaining bar 23 is pressed against the arm 7 under the spring tension exerted by the tension spring 29. The spherical rim 3 is therefore firmly pressed against sealing ring 32 as a result of the pressure of the retaining bar 23 against the arm 7.

With the descent of the flap 1 and the support arms 4, 5 and 7, the assembly acquires a momentum and with the resting of the flap 1 due to the impact of the rim 3 against the sealing ring 32, the acquired momentum of the arms 4 and 5 urge the latter to proceed on their forward movement. This tendency of the arm to move forward causes the sleeve 6 and, in consequence, the collar 13 to move forward slightly thereby freeing the rod 12 and, in consequence, the flap 1 to swivel slightly about the common centre of the spherical surfaces of the bearing 14 and the rim 3.

Thus, by virtue of the fact that the flap is coupled to its support arm so as to be capable of pivoting about a point which is the centre of the spherical rim of the flap permits the self-centering of the flap within the aperture thereby ensuring an effective and safe seal of the aperture. This self-centering property of the flap overcomes any slight manufacturing tolerances in the production of the sealing device or any slight distortion which may occur during repeated sealing operations.

The sealing arrangement just described is suitable for use where the sealing flap is to seal a duct or channel of relatively substantial size and wherein the entire arrangement, including the support axle and retaining device, can be disposed within this duct. It is sometimes however not convenient (due to limited size of the duct, for example) to include the entire flap supporting mechanism within the duct. In such a case arrangements have to be made for the coupling of the flap to its support and for the movement of the flap to be such as not to interfere with the effecting of the seal.

Such a flap with its mounting is shown in FIGS. 4 and 5 of the drawings. The flap and flap seat employed in the arrangement shown in FIG. 4 of the drawings are similar to that employed in the arrangement illustrated in FIG. 1 and bear the same references. The flap support means and the nature of the coupling of the flap support means to the flap differ from that illustrated in FIG. 1. The flap support means comprises a curved arm 36 which is secured at its upper end to a horizontal axle 37 which is rotatably mounted on bearings 38 and which is also secured to a lever 39 adapted for connection to a drop weight incorporating a retaining mechanism to be described in detail below with reference to FIG. 6 of the drawings.

As seen in FIG. 5 of the drawings, the lower portion 40 of the curved rod 36 extends through a sleeve 41 secured at its edge to the flap 1 and surrounding a central aperture 42 formed in the disc 2. The end of the lower portion 40 of the curved rod is screw-threaded and screw fitted thereon is a spherically faced swivel bearing 43 which is held in position by means of a locknut 44. The spherically faced bearing 43 bears on a conical surface 45 of an annular collar 46 which is screwed into the end of the sleeve 41 remote from the disc 2. The inner face of the collar 46 bears via an annular disc 47 against one face of a compressed annular rubber plug 48, the other face of the plug bearing against a shoulder 49 rigidly secured to the rod 40. Secured to the rod 40 at a position close to the disc 2 is a further collar 50 in the rim of which is located a resilient ring 51 which keeps coaxial with the lower portion of the curved rod 40.

The lever 39 is coupled to a drop weight incorporating a retaining device as shown in FIG. 6 of the drawings. The drop weight consists of a sealed cylindrical container 55 in which is disposed a cylindrical weight 56 supported within the container by means of a spring 57. The weight is formed with a central bore 58 on the upper rim of which rests a sealing ball 59 which is retained in the vicinity of the rim by means of a cage 60. The cylindrical walls of the weight 56 are slightly spaced from the adjacent walls of the container 55. The cylindrical weight rests on a viscous fluid such as brake oil.

In use, when the flap is released the drop weight falls and as the flap hits the flap seat, its tendency to spring back is counteracted by the fact that the cylindrical weight, owing to its acquired momentum, continues its downward movement against the effect of the spring. In consequence of this downward movement, the oil passes up through the central bore 58 displacing the ball 59. Thus, the continued movement of weight downwards after the flap has contacted its seat militates against any spring back of the flap. When the weight has reached a standstill position, it will start to rise in the container under the influence of the spring 57 at a slow rate determined by the rate of return flow of the oil around the sides of the weight.

In use, the flap is retained in a substantially horizontal position within a tube to be sealed by any suitable quick release retaining device such as that to be described below with reference to FIG. 7 of the drawings.

As before, the spherical rim 3 and the spherical bearing surface of the bearing 43 are concentric and therefore in view of the resilient nature of the coupling between the disc and the swivel joint via the compressed rubber plug 48 and also in view of the limited degree of elasticity of the curved support rod 36, the flap is capable of a limited degree of self-centering swivelling adjustment about the centre of its spherical rim.

It will be understood that the compressed rubber plug 48 in additon to serving for pressing the collar 46 against the spherical bearing 43 also serves as an airtight seal.

Reference will now be made to FIG. 7 in which is illustrated a mechanism whereby the flap can be retained away from its seating but can be readily released from such retention. The mechanism comprises a lazy tongs device 62 which is pivoted about an axle 63 and which is shown gripping at one end the head of the pin 35 referred to above with reference to FIG. 7 of the drawings. The other end of the device 62 is coupled to the core 64 of a solenoid 65. In the position shown in FIG. 7, current flows through the solenoid 65 drawing the core upwards and causing the tongs retainingly to grip the pin 35. As soon however as current ceases to flow through the solenoid, the core drops causing the tongs to release the pin and, in consequence, the flap falls into a sealing position.

I claim:
1. An emergency sealing device for sealing an aperture comprising a drop flap, having a substantially spherically faced rim, a sealing ring fixed around the aperture and against which the rim is adapted sealingly to seat, flap support means adapted to be pivotally mounted with respect to a support structure, coupling means for coupling the flap support to the drop flap as to permit limited pivotal displacement of the flap with respect to the support means about a point substantially located at the spherical centre of the rim, first means for releasably retaining the flap out of engagement with the sealing ring and second means for automatically locking and retaining the flap in sealing engagement with the sealing ring after the flap has been released so as to drop into said sealing engagement, said second means comprising a pivotally mounted lever, spring biased into rotation toward said flap.

2. An emergency sealing device according to claim 1, wherein said coupling means comprises a spherically faced bearing concentric with said spherically faced rim and included in a swivel joint.

3. An emergency sealing device according to claim 2, wherein there is furthermore provided a spindle secured to said spherically faced bearing and to a central portion of said flap from which it extends normally and wherein said flap support means includes a sleeve surrounding said spindle, support arms attached to said sleeve and which are adapted to be pivotally mounted with respect to said support structure, said sleeve being provided at one end with a conical seating which is spring biased on to said spherically faced bearing.

4. An emergency sealing device for sealing an aperture, comprising a drop flap having a substantially spherically faced rim, a sealing ring fixed around the aperture and against which the rim is adapted sealingly to seat, flap support means comprising a curved support arm pivotally mounted at one end with respect to a support structure, coupling means comprising a sleeve secured at one end to said flap and extending axially outward therefrom, the other end of said sleeve having a conical seat, the other end of said curved support arm extending through said seat and said sleeve, a spherically faced bearing secured to said other end of said support arm encompassing said support arm and a compressed rubber plug retaining said bearing against said seat to define a swivel joint, said plug providing a seal between the sleeve and the support arm, whereby said swivel coupling permits limited pivotal displacement of the flap with respect to the support means about a point substantially located at the spherical center of said rim, first means for releasably retaining the flap out of engagement with the sealing ring and second means for retaining the flap in sealing engagement with the sealing ring after the flap has been released so as to drop into said sealing engagement.

5. An emergency sealing device for sealing an aperture comprising a drop flap having a substantially spherically faced rim, a sealing ring fixed around the aperture and against which the rim is adapted sealingly to seat, flap support means adapted to be pivotally mounted with respect to a support structure, coupling means for coupling the flap support to the drop flap as to permit limited pivotal displacement of the flap with respect to the support means about a point substantially located at the spherical center of the rim, first means for releasably retaining the flap out of engagement with the sealing ring and second means for automatically locking and retaining the flap in sealing engagement with the sealing ring after the flap has been released so as to drop into said sealing engagement, said second means comprising a drop weight connected to said flap and arranged to drop by gravity under release of said flap, said drop weight comprising a sealed container, a spring supported weight in said container, a viscous fluid between said weight and the bottom of the container and valve means associated with said weight to permit relative rapid downward movement of the weight in the container and relative slow upward movement of said weight.

References Cited in the file of this patent

UNITED STATES PATENTS

| | | |
|---|---|---|
| 2,274,319 | Chesterman | Feb. 24, 1942 |
| 2,556,354 | Williamson et al. | June 12, 1951 |
| 2,816,683 | Miers et al. | Dec. 17, 1957 |